United States Patent [19]

Cho et al.

[11] Patent Number: 4,806,329
[45] Date of Patent: Feb. 21, 1989

[54] METHOD OF PRODUCING GRANULAR SYNTHETIC SILICA

[75] Inventors: Toshitsura Cho, Kawasaki; Mamoru Yoshizako, Machida, both of Japan

[73] Assignee: Tama Chemicals Co., Ltd., Tokyo, Japan

[21] Appl. No.: 903,547

[22] Filed: Sep. 4, 1986

[30] Foreign Application Priority Data

Sep. 9, 1985 [JP] Japan ................................ 60-197562

[51] Int. Cl.$^4$ ............................................. C01B 33/12
[52] U.S. Cl. .................................................... 423/339
[58] Field of Search ........................ 423/336, 338, 339

[56] References Cited

U.S. PATENT DOCUMENTS 3,798,174  3/1974  Acker et al. ......................... 423/339
3,850,971  11/1974  Termin et al. ...................... 423/338
3,983,055  9/1976  Mitchell et al. ..................... 423/336
4,327,065  4/1982  von Dardel et al. ................ 423/335
4,402,927  9/1983  von Dardel et al. ................ 423/335

FOREIGN PATENT DOCUMENTS 57-191238  11/1982  Japan .
 59-64542   4/1984  Japan .
  0107938   6/1984  Japan ................................. 423/338
59-182237  10/1984  Japan .

OTHER PUBLICATIONS

Chemical Abstracts, vol. 104, No. 9, 68423m, 3/3/86 Hydrolysis of tetraethoxysilane in the presence of salt catalysts.

Primary Examiner—John Doll
Assistant Examiner—Lori S. Freeman
Attorney, Agent, or Firm—Armstrong, Nikaido, Marmelstein & Kubovcik

[57] ABSTRACT

A method of producing synthetic silica which is characterized by hydrolyzing a tetraalkoxysilane under a basic condition in the presence of an ammonium salt.

6 Claims, No Drawings

METHOD OF PRODUCING GRANULAR SYNTHETIC SILICA

BACKGROUND OF THE INVENTION

1. Field of the Invention

The present invention relates to a method of producing synthetic silica. In particular, it relates to a method of producing synthetic silica by means of hydrolysis of tetraalkoxysilanes.

2. Description of the Prior Art

In recent years, synthetic silica has been used as a filler for a resin composition for encapsulation of electronic parts, or as a raw material for producing multicomponent optical fibers, fine ceramics, optical glasses, etc. Synthetic silica used for such uses is generally required to have a high purity and a high bulk specific density. In particular, with the increase in the degree of integration in LSIs and VLSIs, synthetic silica to be used as a filler for encapsulation compositions for electronic parts is required to be highly pure and, at the same time, to have a small surface specific area, for the purpose of avoiding malfunction of semiconductors. To be specific, the content of such impurities as U and Th which tend to cause malfunction of semiconductors by emitting α-ray, and other impurities, such as Na, Mg, Ca, Fe, Al, Cr, Cu, Mn and Ti, and compounds thereof, should not exceed 0.001 ppm.

Various methods are known for the production of synthetic silica. For example, in Japanese Patent Application Laid Open No. 191,238/82 there is proposed a method for producing synthetic silica, in which a tetraalkoxysilane is hydrolyzed with a solution of ammonium hydroxide in ethanol. Silica particles produced by this method, however, are extremely fine and, hence, could not be filtered readily. Therefore, this method is not suited for commercial production of synthetic silica.

Japanese Patent Application Laid Open No. 64,542/84 describes a method in which ammonia gas is injected into an aqueous ethanol solution of a tetraalkoxysilane to effect hydrolysis of the silane. This method, however, has the disadvantage that gellation of silica takes place along with the hydrolysis and, hence, it is hardly possible to obtain silica particles having a uniform particle size.

In Japanese Patent Application Laid Open No. 182,237/84, there is proposed a method in which a tetraalkoxysilane and an aqueous methanol solution of a sodium alcoholate are dispersed into a liquid or air to effect hydrolysis of the silane. However, synthetic silica produced by this method tends to be contaminated with sodium derived from the sodium alcoholate used for the hydrolysis. It is hardly possible to obtain synthetic silica having the desired purity.

It is, therefore, an object of the present invention to provide a method of producing synthetic silica which is free from the above disadvantages.

Other objects of the invention will become apparent from the following descriptions.

SUMMARY OF THE INVENTION

According to the present invention, there is provided a method of producing synthetic silica wherein a tetraalkoxysilane is hydrolyzed under a basic condition in the presence of an ammonium salt.

As examples of tetraalkoxysilanes usable as a raw material in the method according to the invention, mention may be made of tetramethoxysilane, tetraethoxysilane, tetrapropoxysilanes, tetrabutoxysilanes, tetraphenoxysilane, tetrabenzyloxysilane, and the like. Of these silanes, tetramethoxysilane and tetraethoxysilane can be used with advantage for the production of a synthetic silica having a high purity. These tetraalkoxysilanes can be produced, for example, by a reaction between a silicon tetrachloride and an alcohol or a phenol; by a reaction of silicon disulfide or magnesium silicide with an alcohol; by a reaction of metallic silicon, iron silicide, ferrosilicon or mixtures of these with an alcohol, in the presence of a metal alcoholate (see Japanese Patent Publication No. 8,217/70; or the like.

In the present invention, synthetic silica is produced by hydrolyzing such a tetraalkoxysilane in the presence of an ammonium salt.

Ammonium salts to be used for the above purpose may be either an inorganic ammonium salt obtained by a reaction between ammonia and an inorganic acid, or an organic ammonium salt obtained by a reaction between ammonia and an organic acid.

For the purpose of producing highly pure synthetic silica usable for encapsulating compositions, there can be used with advantage an ammonium salt capable of being decomposed into volatile components which can be readily removed off by a conventional after-treatment and, hence, does not remain in the synthetic silica produced therefrom.

As specific examples of such ammonium salts, mention may be made of inorganic ammonium salts, such as ammonium nitrate, ammonium hydrochloride, ammonium sulfate, ammonium carbonate and ammonium hydrogencarbonate; organic ammonium salts, such as ammonium formate, ammonium acetate, ammonium oxalate and ammonium propionate; and ammonium salts of hydroxy organic acids, such as tartaric acid and malic acid. These ammonium salts can be used either alone or in combination of more than one of them.

There is no particular limitation on the method of introducing an ammonium salt into the reaction system to effect the hydrolysis. However, it can be advantageous to dissolve an ammonium salt into water and use the aqueous solution for the hydrolysis. The amount of ammonium salts to be used for the hydrolysis depends on the kinds of tetraalkoxysilanes and ammonium salts used, as well as on the uses of synthesized silica. In general, the ammonium salts are used in an amount not less than 0.1% by weight, preferably not less than 1% by weight, based on water, which is used for the hydrolysis. The maximum amount of usable ammonium salts is limited by their solubilities to water used for the hydrolysis.

In the case where ammonium salts are used in the form of a solution dissolved in water to be used for the hydrolysis, the granularity of synthetic silica produced can be controlled by regulating the concentration of ammonium salts in the aqueous solution used. That is, synthetic silica having a larger grain size can be produced by using an aqueous solution of ammonium salts having a higher concentration, whereas synthetic silica having a smaller grain size can be obtained by using a dilute aqueous solution of ammonium salts. Accordingly, synthetic silica having a desired granularity can be produced by changing the concentration of the aqueous solution of ammonium salts in accordance with the uses etc. of synthetic silica to be produced.

In the present invention, the theoretical amount of water to be used for the hydrolysis is 2 moles per mole of tetraalkoxysilanes. It can, however, be preferable to use water in an amount of 2.2 moles or more, so as to allow the hydrolysis to proceed completely.

In the present invention, the hydrolysis of tetraalkoxysilanes is conducted under a basic condition, if desired, by using a pH adjuster. The pH of the reaction mixture is usually adjusted to 7 or above, preferably in the range of from 8.5 to 11, during the hydrolysis. When the pH of the reaction solution is shifted to the acidic side (lower than pH 8.5), synthetic silica having a desired granularity could hardly be obtained because of the gelation of silica and the resulting poor filtering properties. On the other hand, in order to maintain its pH higher than 11, expensive chemicals, such as tetramethylammonium hydroxide and choline, must be used. This makes its production cost undesirably high.

In the hydrolysis according to the invention, any pH adjuster can be used only if it is capable of regulating the pH of the reaction solution to a desired value. For the purpose of producing highly pure synthetic silica, there can be used with advantage a pH adjuster capable of being decomposed into volatile components which can be readily removed off by a conventional after-treatment and, hence, does not remain in the synthetic silica produced therefrom. As specific examples of such pH adjusters, mention may be made of aqueous and/or alcohol solutions of ammonia, tetramethylammonium hydroxide and choline.

There is no particular limitation on the temperature of the hydrolysis of tetraalkoxysilanes. It is usually carried out at a temperature between 0° C. and the boiling point of the alcohol generated by the hydrolysis. For example, under atmospheric pressure, the hydrolysis is carried out at a temperature in the range of from 0° C. to 64° C., preferably from 30° C. to 60° C. in the case where tetramethoxysilane is used as a tetraalkoxysilane, whereas it is from 0° C. to 78° C., preferably from 30° C. to 70° C. in the case where tetraethoxysilane is used as a tetraalkoxysilane. When the reaction temperature is lower than 0° C., the rate of hydrolysis may become too small. When the reaction temperature is higher than the boiling point of the alcohol generated through the hydrolysis, the hydrolysis hardly proceeds uniformly because of the gelation of the product. When the reaction is carried out under an elevated pressure, the temperature range applicable to the reaction becomes wider since the alcohols have higher boiling points under higher pressures.

The hydrolysis of the present invention can be conducted by either a batch process or a continuous process. In the case of a batch process, it may be carried out, for example, in the following manner: A prescribed amount of an aqueous solution of an ammonium salt is charged into a reaction vessel, a tetraalkoxysilane or an alcohol solution thereof is dropped thereinto, and then the resulting mixture is subjected to filtration. In the case of a continuous process, it may be carried out, for example, in the following manner: Into a reactor are continuously fed a prescribed aqueous solution of an ammonium salt and a tetraalkoxysilane or a solution of a tetraalkoxysilane in alcohol by using constant rate pumps, and the slurry formed is continuously drawn out of the reactor and then filtered. Various reactors can be used for the hydrolysis, including those made of glass or stainless steel, as well as those having a lining of resins, such as Teflon or the like. The kind of reactor to be used therefor can be decided according to the allowable level of impurities.

The particles of synthetic silica produced in accordance with the method of the present invention are spherical and almost uniform in their size under observation by a microscope. Synthetic silica having an extremely high purity can be produced by using an appropriate ammonium salt and, where desired, a pH adjuster. The thus prepared synthetic silica can be particularly suited for use as a filler for resin compositions for encapsulation of electronic parts, or as a raw material for producing multicomponent optical fibers, fine ceramics, optical glasses, and the like.

DETAILED DESCRIPTION OF THE PREFERRED EMBODIMENT

The method of the present invention will further be illustrated hereinbelow by way of examples. Reaction conditions employed and the results of the reactions are shown in Tables 1 and 2, respectively.

EXAMPLE 1

Into a glass reactor equipped with a stirrer was charged 43.3 parts by weight of an aqueous 10% by weight solution of ammonium carbonate containing, as a pH adjuster, 5% by weight of ammonia. To this was added with stirring over a period of 4 hours a mixture of 100 parts by weight of tetramethoxysilane and 66.7 parts by weight of methanol, to effect hydrolysis. During the addition, the temperature of the reaction mixture was raised from 20° C. to 55° C., as is shown in Table 1.

After the completion of the reaction, the reaction mixture was filtered, washed with water and dried at 200° C. for 5 hours. The yield and the physical properties of the synthetic silica obtained were examined. The results obtained are shown in Table 1. The thus obtained silica was also observed under a microscope. The particles of the silica were almost spherical.

EXAMPLE 2

Synthetic silica was produced in the same manner as in Example 1, except that a reactor made of stainless steel and equipped with a stirrer was used instead of the glass reactor and an aqueous 10% by weight ammonium nitrate solution containing, as a pH adjuster, 5% by weight of ammonium was used instead of the aqueous 10% by weight ammonium carbonate solution containing ammonia. The yield and the physical properties of the synthetic silica produced were examined. Results obtained are shown in Table 2.

EXAMPLE 3

Synthetic silica was produced in the same manner as in Example 2, except that an aqueous 3% by weight ammonium nitrate solution containing, as a pH adjuster, 5% by weight of ammonia was used instead of the aqueous 10% by weight ammonium nitrate solution containing ammonia. The yield and the physical properties of the synthetic silica produced were examined. Results obtained are shown in Table 2.

EXAMPLE 4

Synthetic silica was produced in the same manner as in Example 2, except that an aqueous 10% by weight ammonium hydrochloride solution containing, as a pH adjuster, 5% by weight of ammonia was used instead of the aqueous 10% by weight ammonium nitrate solution containing ammonia. The yield and the physical properties of the synthetic silica produced were examined. Results obtained are shown in Table 2.

EXAMPLE 5

Into the lower part of a continuous reactor made of a polypropylene and equipped with a stirrer were separately charged at constant rates 50 parts by weight of an aqueous 5% by weight ammonium carbonate solution containing, as a pH adjuster, 5% by weight of ammonia and 100 parts by weight of tetramethoxysilane, and then the reaction mixture was allowed to stay in the reactor for 3 hours, during which the temperature of the reaction mixture was raised from 20° C. to 55° C., as is shown in Table 1. After the completion of the reaction, the reaction product was continuously drawn out from the upper part of the reactor, filtered and dried under the same conditions as in Example 1. The yield and the physical properties of the thus prepared synthetic silica were examined. Results obtained are shown in Table 2.

EXAMPLE 6

Into a stainless steel reactor equipped with a stirrer was charged 43.3 parts by weight of an aqueous 10% by weight ammonium hydrochloride solution containing, as a pH adjuster, 5% by weight of ammonia. To this was added with stirring over a period of 2 to 2.5 hours a mixture of 100 parts by weight of tetramethoxysilane and 66.7 parts by weight of methanol, to effect hydrolysis. During this addition, the temperature of the reaction mixture was raised as shown in Table 1.

After the completion of the reaction, the reaction mixture was filtered, washed with water, and then dried at 200° C. for 8 hours. The yield and the physical properties of the synthetic silica produced were examined. Results obtained are shown in Table 2. The particles of the thus prepared silica was also observed under a microscope. The particles of the silica were almost spherical.

EXAMPLE 7

Synthetic silica was produced in the same manner as in Example 6, except that an aqueous 10% by weight ammonium hydrochloride solution containing, as a pH adjuster, 10% by weight of ammonia was used instead of the aqueous ammonium hydrochloride solution containing 5% by weight of ammonia. The yield and the physical properties of the synthetic silica produced were examined. Results obtained are shown in Table 2.

EXAMPLE 8

Synthetic silica was produced in the same manner as in Example 6, except that an aqueous 10% by weight ammonium nitrate solution containing, as a pH adjuster, 10% by weight of ammonia was used instead of the aqueous ammonium hydrochloride solution containing 5% by weight of ammonia. The yield and the physical properties of the thus prepared synthetic silica were examined. Results obtained are shown in Table 2.

EXAMPLE 9

Synthetic silica was produced in the same manner as in Example 6, except that an aqueous 10% by weight ammonium carbonate solution containing, as a pH adjuster, 5% by weight of ammonia was used instead of the aqueous ammonium hydrochloride solution containing 5% by weight of ammonia. The yield and the physical properties of the thus prepared synthetic silica were examined. Results obtained are shown in Table 2.

EXAMPLE 10

Synthetic silica was produced in the same manner as in Example 6, except that an aqueous 10% by weight ammonium carbonate solution containing, as a pH adjuster, 10% by weight of ammonia was used instead of the aqueous ammonium hydrochloride solution containing 5% by weight of ammonia. The yield and the physical properties of the thus prepared synthetic silica were examined. Results obtained are shown in Table 2.

EXAMPLE 11

Synthetic silica was produced in the same manner as in Example 6, except that an aqueous 10% by weight ammonium hydrogencarbonate containing, as a pH adjuster, 5% by weight of ammonia was used instead of the aqueous ammonium hydrochloride solution containing 5% by weight of ammonia. The yield and the physical properties of the thus prepared synthetic silica were examined. Results obtained are shown in Table 2.

EXAMPLE 12

Synthetic silica was produced in the same manner as in Example 6, except that an aqueous ammonium acetate solution containing, as a pH adjuster, 5% by weight of ammonia was used instead of the aqueous ammonium hydrochloride solution containing 5% by weight of ammonia. The yield and the physical properties of the thus prepared synthetic silica were expained. Results obtained are shown in Table 2.

EXAMPLE 13

Synthetic silica was produced in the same manner as in Example 6, except that an aqueous 10% by weight ammonium acetate solution containing, as a pH adjuster, 10% by weight of ammonia was used instead of the aqueous ammonium hydrochloride solution containing 5% by weight of ammonia. The yield and the physical properties of the thus prepared synthetic silica were examined. Results obtained are shown in Table 2.

EXAMPLE 14

Synthetic silica was produced in the same manner as in Example 6, except that an aqueous 10% by weight ammonium formate solution containing, as a pH adjuster, 5% by weight of ammonia was used instead of the aqueous ammonium hydrochloride solution containing 5% by weight of ammonia. The yield and the physical properties of the thus prepared synthetic silica were examined. Results obtained are shown in Table 2.

EXAMPLE 15

Into a glass reactor equipped with a stirrer was charged 54 parts by weight of tetraethoxysilane. To this was added with stirring over a period of 5 hours a mixture of 18.16 parts by weight of an aqueous 19% by weight ammonium carbonate solution containing, as a pH adjuster, 18% by weight of ammonia and 38 parts by weight of 90% ethanol, to effect hydrolysis. During the addition, the temperature of the reaction mixture was raised to the value shown in Table 1.

After the completion of the reaction, the reaction product was filtered off, washed with water and dried at 200° C. for 8 hours. The yield and the physical properties of the synthetic silica prepared were then examined. Results obtained are shown in Table 2. The thus prepared synthetic silica was also observed under a microscope. The particles of the silica were almost spherical.

nia. The product formed by this reaction was in the state of a gel and could not be filtered, as in Comparative Example 1.

TABLE 1

| Example | Ammonium Salt Used | Aqueous Ammonia (%) | Reaction Temperature (°C.) Initial | Maximum | PH of the Reaction Mixture | |
|---|---|---|---|---|---|---|
| 1 | $(NH_4)_2CO_3$ | 5 | 20 | 55 | 9.8 | |
| 2 | $NH_4NO_3$ | 5 | 20 | 55 | 9.7 | |
| 3 | $NH_4NO_3$ | 5 | 20 | 55 | 10.1 | |
| 4 | $NH_4Cl$ | 5 | 20 | 55 | 9.6 | |
| 5 | $(NH_4)_2CO_3$ | 5 | 20 | 55 | 10.1 | |
| | | | | | Before Reaction | After Reaction |
| 6 | $NH_4Cl$ | 5 | 13.0 | 29.5 | 10.05 (12.8° C.) | 8.64 (14.9° C.) |
| 7 | $NH_4Cl$ | 10 | 13.4 | 31.0 | 10.73 (13.4° C.) | 9.20 (17.8° C.) |
| 8 | $NH_4NO_3$ | 10 | 14.2 | 32.0 | 10.97 (13.4° C.) | 9.68 (14.5° C.) |
| 9 | $(NH_4)_2CO_3$ | 5 | 12.2 | 32.0 | 10.49 (12.8° C.) | 9.14 (13.1° C.) |
| 10 | $(NH_4)_2CO_3$ | 10 | 14.0 | 37.0 | 11.09 (13.4° C.) | 10.05 (14.8° C.) |
| 11 | $NH_4HCO_3$ | 5 | 12.0 | 29.0 | 10.52 (12.8° C.) | 9.20 (13.0° C.) |
| 12 | $CH_3COONH_4$ | 5 | 11.9 | 28.5 | 10.38 (12.8° C.) | 9.28 (14.5° C.) |
| 13 | $CH_3COONH_4$ | 10 | 14.2 | 31.2 | 11.13 (13.4° C.) | 9.95 (16.5° C.) |
| 14 | $HCOONH_4$ | 5 | 13.8 | 28.0 | 10.23 (12.8° C.) | 9.01 (13.0° C.) |
| 15 | $(NH_4)_2CO_3$ | 18 | 13.1 | 31.0 | 10.29 (12.8° C.) | 9.05 (13.0° C.) |

TABLE 2

| Example | Bulk Density (g/ml) | Distribution of Grain Size (Wt %) <47 μm | 47–74 μm | 74–149 μm | 149 μm< | Yield (Wt %) |
|---|---|---|---|---|---|---|
| 1 | 0.753 | 30 | 45 | 20 | 5 | 98.5 |
| 2 | 0.721 | 28 | 52 | 15 | 5 | 98.6 |
| 3 | 0.680 | 59 | 30 | 13 | 3 | 97.2 |
| 4 | 0.748 | 30 | 45 | 20 | 5 | 98.1 |
| 5 | 0.864 | 81 | 9 | 5 | 5 | 96.2 |

| Example | Bulk Density (g/ml) | 20–30 μm | 30–40 μm | 40–50 μm | 50–60 μm | 60–70 μm | 70–80 μm | 80–90 μm | Yield (Wt %) |
|---|---|---|---|---|---|---|---|---|---|
| 6 | 0.764 | 6.7 | 12.7 | 28.4 | 27.6 | 10.0 | 8.1 | 6.5 | 98.1 |
| 7 | 0.862 | 4.7 | 54.2 | 22.0 | 11.2 | 7.9 | 0.0 | 0.0 | 98.7 |
| 8 | 0.738 | 8.9 | 16.6 | 36.9 | 23.1 | 9.7 | 3.1 | 1.7 | 98.6 |
| 9 | 0.748 | 6.6 | 11.8 | 16.1 | 32.3 | 27.3 | 5.9 | 0.0 | 98.5 |
| 10 | 0.744 | 3.3 | 45.7 | 31.4 | 12.7 | 4.6 | 2.3 | 0.0 | 98.7 |
| 11 | 0.718 | 9.5 | 19.1 | 38.5 | 18.6 | 14.3 | 0.0 | 0.0 | 97.5 |
| 12 | 0.800 | 6.1 | 20.3 | 49.2 | 20.1 | 4.3 | 0.0 | 0.0 | 97.7 |
| 13 | 0.760 | 2.9 | 26.6 | 51.4 | 17.1 | 2.0 | 0.0 | 0.0 | 98.1 |
| 14 | 0.786 | 4.8 | 21.4 | 47.7 | 19.5 | 3.3 | 2.9 | 0.4 | 97.1 |

| Example | Bulk Density (g/ml) | Distribution of Grain Size 0–10 μm | 10–20 μm | 20–30 μm | Yield (Wt %) |
|---|---|---|---|---|---|
| 15 | 0.345 | 35.8 | 62.3 | 1.9 | 98.4 |

COMPARATIVE EXAMPLE 1

Synthetic silica was produced by a batch process in a similar manner as in Example 1, except that a 5% by weight aqueous ammonia containing no ammonium salt was used in place of the aqueous ammonium carbonate solution containing 5% by weight of ammonia. The product obtained by this reaction was in the state of a gel and could not be filtered. In this comparative example, the pH of the reaction system was 11.6.

COMPARATIVE EXAMPLE 2

Synthetic silica was produced by a continuous process in a similar manner as in Example 5, except that a 5% by weight aqueous ammonia containing no ammonium salt was used in place of the aqueous ammonium carbonate solution containing 5% by weight of ammo- As described hereinabove in detail, the present invention provides a method of producing synthetic silica consisting of almost uniform spherical particles, without suffering from gelation at the time of hydrolysis. The method makes it possible to produce synthetic silica at a high productivity since silica particles produced by the method can be filtered quite readily. In addition, when an appropriate ammonium salt and optionally a pH adjuster are used, a highly pure synthetic silica usable for a sealant can be readily obtained.

What is claimed is:

1. A method of producing granular synthetic silica comprising the steps of, hydrolyzing a tetraalkoxysilane under a basic condition in the presence of an ammonium salt wherein said hydrolisis is carried out at a pH in the range of 8.5 to 11, to synthesize silica particles, and filtering said silica particles to produce granular synthetic silica.

2. A method of producing granular synthetic silica as claimed in claim 1, wherein said tetraalkoxysilane is tetramethoxysilane.

3. A method of producing granular synthetic silca as claimed in claim 1, wherein said tetraalkoxysilane is tetraethoxysilane.

4. A method of producing granular synthetic silica as claimed in claim 1, wherein said ammonium salt is an inorganic ammonium salt selected from the group consisting of ammonium nitrate, ammonium hydrochloride, ammonium sulfate, ammonium carbonate and ammonium hydrogencarbonate.

5. A method of producing granular synthetic silica as claimed in claim 1, wherein said ammonium salt is an organic ammonium salt selected from the group consisting of ammonium formate ammomium acetate, ammonium oxalate and ammonium propionate.

6. A method of producing granular synthetic silica as claimed in claim 1, wherein the pH is adjusted with ammonia.

* * * * *

UNITED STATES PATENT AND TRADEMARK OFFICE
CERTIFICATE OF CORRECTION

PATENT NO. : 4,806,329

DATED : February 21, 1989

INVENTOR(S) : CHO et al

It is certified that error appears in the above-identified patent and that said Letters Patent is hereby corrected as shown below:

Column 2, line 31, "ammonium hydrochloride" should read --ammonium chloride--.

Column 4, line 36, "Table 1" should read --Table 2--; line 65, "ammonium hydrochloride" should read --ammonium chloride--.

Column 5, lines 24, 43, 55 and 65, "ammonium hydrochloride" should read --ammonium chloride--.

Column 6, lines 7, 17, 27, 37, and 48, "ammonium hydrochloride" should read --ammonium chloride--.

Column 9, line 3, "hydrolisis" should read --hydrolysis--.

Column 10, line 2, "ammonium hydrochloride" should read --ammonium chloride--.

Signed and Sealed this

Seventeenth Day of October, 1989

Attest:

DONALD J. QUIGG

Attesting Officer

Commissioner of Patents and Trademarks